United States Patent [19]

Miller et al.

[11] Patent Number: 4,481,550
[45] Date of Patent: Nov. 6, 1984

[54] METHOD AND APPARATUS FOR FOLLOWING A RECORDED DATA TRACK WITH A READ HEAD

[75] Inventors: Armin Miller, Palo Alto; Lauren V. Merritt, Los Altos, both of Calif.

[73] Assignee: Datacopy Corporation, Mountain View, Calif.

[21] Appl. No.: 371,862

[22] Filed: Apr. 26, 1982

[51] Int. Cl.³ .................... G11B 5/58; G11B 21/10
[52] U.S. Cl. .................................. 360/77; 318/616; 369/43
[58] Field of Search .............. 318/616; 360/70, 75, 360/77; 369/43, 44, 51

[56] References Cited

U.S. PATENT DOCUMENTS

| | | | |
|---|---|---|---|
| 3,126,535 | 3/1964 | Streeter | 360/77 |
| 3,673,412 | 6/1972 | Olson | 369/44 |
| 3,924,268 | 12/1975 | McIntosh et al. | 360/78 |
| 4,223,358 | 9/1980 | Kubota et al. | 360/75 |
| 4,232,201 | 11/1980 | Canino | 369/44 |

Primary Examiner—George G. Stellar
Attorney, Agent, or Firm—Owen L. Lamb

[57] ABSTRACT

A playback head (155) is moved across a recording medium (151) orthogonally to a data track by playback head-moving means (157, 159, and 161), said data track being independently moved so that previously-recorded data is sequentially recovered. An electrical signal, which bears a direct relationship to the velocity of the head-moving means, is produced by a position sensor affixed to the head-moving means and a differentiator (169). Said signal is used to close a velocity loop, through a summing junction (171) and a power amplifier (173), around the head-moving means. The playback head is moved in addition, at a relatively high frequency, by dithering means which causes an amount of head motion that is small with respect to the width of the data track. The dither motion causes an amplitude modulation of the signal being recovered from the data track by the playback head. The amplitude modulation contains information on the instantaneous position of the playback head with respect to the center line of the data track. This instantaneous position information is recovered through the use of an amplitude detector (177), a bandpass filter (45), a synchronous rectifier or a pair of sample-and-holds controlled by the dither frequency, and a second filter (49), the result being a steering signal that is applied to the summing junction. The end result is that the playback head stays substantially on the center line of the data track regardless of disturbances to this alignment.

15 Claims, 5 Drawing Figures

METHOD AND APPARATUS FOR FOLLOWING A RECORDED DATA TRACK WITH A READ HEAD

CROSS-REFERENCE TO RELATED APPLICATIONS

U.S. patent application Ser. No. 06/078,204, of Charles A. Lindberg, entitled "Electronic Camera Employing a Solid-State Image Sensor," filed on Sept. 24, 1979 and assigned to Datacopy Corporation.

U.S. patent application Ser. No. 06/265,411 of Armin Miller, et al, entitled "Electronic Camera with Means for Recording Optical Images," filed May 19, 1981, and assigned to Datacopy Corporation.

BACKGROUND OF THE INVENTION

1. Field of the Invention

The invention relates to moving media storage technology and, more particularly, to a method and apparatus for the reading of electrical signals which have been recorded onto a moving recording medium.

2. Description of the Prior Art

In the above-referenced copending patent application Ser. No. 06/265,411 of Armin Miller, et al, there is described a high-resolution, electronic camera with storage capability. The image at the focal plane of a lens is scanned in one direction by a linear photodiode array, and in the orthogonal direction by relative motion of the linear array with respect to the lens. This relative motion is translated into comparable relative motion of a recording head with respect to a recording media, such as a small flexible disk, by mechanical or electronic linkage so that the pixel information is recorded for later use simultaneously with its generation.

A magnetic-recording medium is used and a voltage-to-time converter is provided to control the spacings of the magnetic transitions impressed onto the magnetic medium in direct proportion to the amount of light collected by the individual photodiodes, so that the gray-scale and timing information of each pixel is preserved.

The Miller, et al application also describes, but does not claim, an apparatus for the reading of the recorded electrical signals corresponding to the scanned image which has been recorded onto the moving recording medium.

The primary object of the present invention is to provide an improved reader which is capable of reading electronic information which has been recorded on a flexible disk or other moving recording media by a high-resolution electronic camera which stores the electronic information generated by moving a linear photodiode array.

SUMMARY OF THE INVENTION

Briefly, the present invention is concerned with a method and apparatus for following, with a reading head, a data track recorded on a recording medium. The apparatus moves a recording medium next to a playback head to thereby allow the playback head to read the information recorded on the data track. The playback head has an electrical signal output representative of information recorded on the data track. The playback head is moved across the recording medium, in a direction that is substantially orthogonal to the data track, by playback head-moving means. An electrical signal, which bears a direct relationship to the velocity of the head-moving means, is produced by a position sensor, affixed to the head-moving means, and a differentiator. This signal is used to close a velocity loop around the head-moving means. The playback head is moved in addition, at a relatively high frequency, by dithering means which causes an amount of head motion that is small with respect to the width of the data track, the dither motion causing an amplitude modulation of the signal being recovered from the data track by the playback head. The amplitude modulation contains information on the instantaneous position of the playback head with respect to the center line of the data track. This instantaneous position information is recovered through the use of means controlled by the source of the dither frequency. The result is a steering signal that is applied to the head-moving means. More specifically, this steering signal serves as a velocity request to the velocity loop so that, when the average dithered head position is not on the center line of the data track, the head-moving means moves the head in the appropriate direction to establish the head position on the center line of the track. The end result is that the playback head stays substantially on the center line of the data track regardless of disturbances to this alignment.

The foregoing and other objects, features, and advantages of the invention will be apparent from the following more detailed description of a preferred embodiment of the invention, as illustrated in the accompanying drawings.

DESCRIPTION

Briefly, the camera mechanism described in the above-referenced copending application Ser. No. 06/265,411, of Miller, et al comprises a linear photodiode array which is mounted on a carriage in the focal plane of a lens. Clock signals cause the sequencing of access circuits built into the array so that the outputs of successive photodiodes appear in sequence on the picture element (pixel) information line. The clock signals are precisely controlled and run continuously. The motion of the carriage in the focal plane is perpendicular to the line of the array. A motor causes the carriage to scan in the focal plane of the lens. The camera mechanism is more fully described in the above-referenced copending application Ser. No. 06/078,204, of Charles A. Lindberg.

A recording head is mechanically or electrically linked to the carriage. A recording disk is placed so that the head will move along a radius (R) of the disk as the carriage moves. Alternatively, the head may be held stationary and the recording medium moved laterally on the carriage. Thus, the movement of the array causes an X/Y scan of an image focused in the focal plane of lens that is simultaneous with an R/θ scan of the disk.

The disk may be a magnetic recording disk and the recording head may be a magnetic recording head. Alternatively, the recording media may be magnetic recording tape, video disks with a laser or other type of recording head, or photographic film with an optical recording head. Because of the movement of the head across the rotating disk in a continuous manner, the pixel information is recorded in a spiral simultaneously with its generation by the photodiode array.

Figure 1:
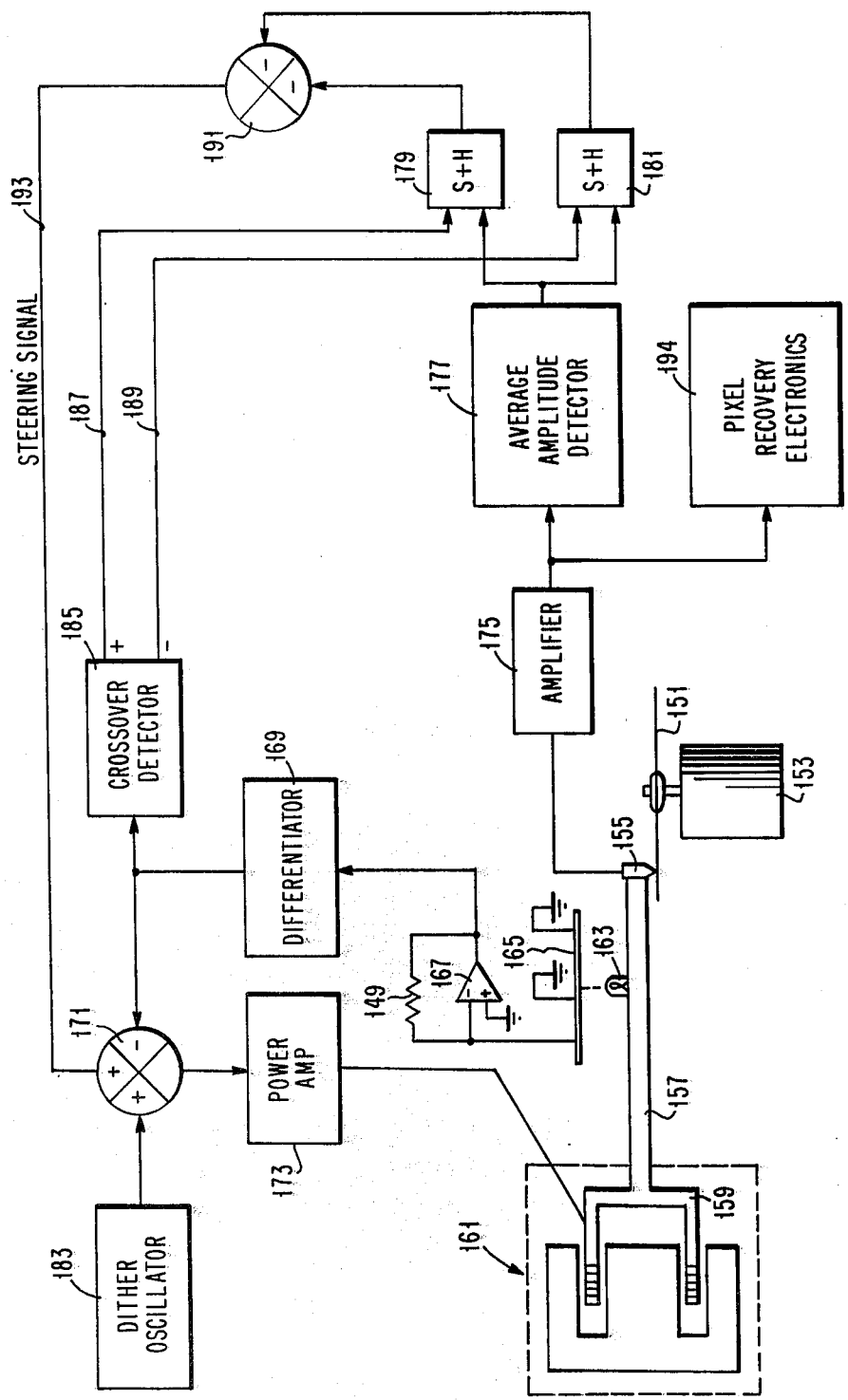
FIG. 1 is a drawing of first embodiment of a playback mechanism along with a block diagram of its controlling electronics.
Figure 2:
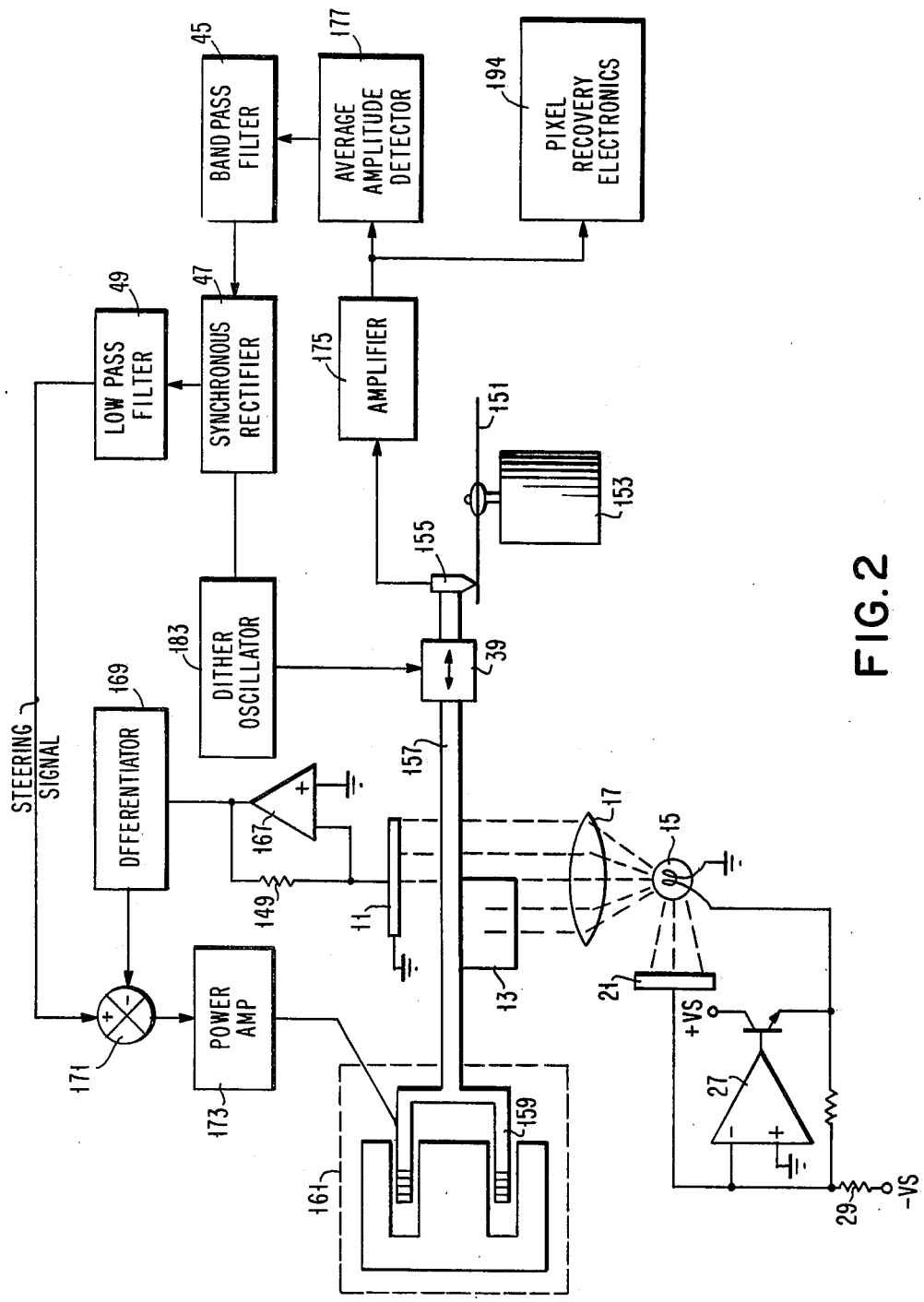
FIG. 2 is a drawing of second embodiment of a playback mechanism along with a block diagram of its controlling electronics.
Figure 3:
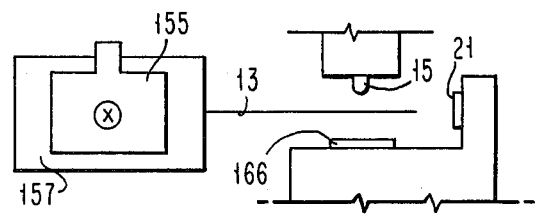
FIG. 3 is a drawing of a carriage position monitor for use with the playback mechanisms of FIGS. 1 and 2.

Referring to FIG. 1, a first embodiment of a playback station will be described. This embodiment is also shown in FIG. 3 of the above-referenced copending application Ser. No. 06/265,411, of Miller, et al. A second embodiment of the invention will be described with respect to FIG. 2.

The recorded track produced by the mechanism described above with respect to the Miller, et al application is a spiral which must be tracked by a playback head. The method for doing this in accordance with the present invention requires that the playback head be dithered around the center line of the recorded data track. An average steering signal is then derived from the relative amplitudes of the signal levels found at the extremes of the dither. In the embodiment of FIG. 1, the dithering is accomplished by moving the entire head carriage arm to which the head is attached. In the embodiment of FIG. 2 the dithering is accomplished by moving the head itself with respect to the head carriage arm.

Referring to FIG. 1, a magnetic disk (151) on which information has been recorded is spun by motor (153) next to playback head (155). The head (155) is positioned by playback head carriage arm (157) (bearings and guide rails not shown) which is connected to the armature (159) of linear motor (161), energizable by means of a coil wrapped around the armature (159). A lamp (163) is also mounted on playback head carriage arm (157) so that it illuminates a differential photodetector (165). This type of photocell is built long and narrow and with heads at both ends. Photoelectrons generated in the cell are collected at one end or the other, with the end that is closest to the point of generation getting proportionately more. The output of photocell (165) is pulled through resistor (149) by amplifier (167) so that the amplifier's output voltage bears a direct relationship to the relative position of the playback head carriage arm (157). An alternative position detector is shown in FIGS. 2 and 3, and will be described subsequently. The output of amplifier (167) is connected to differentiator (169) in order to drive power amplifier (173) through summing junction (171), the output of which supplies current to the coil wrapped around the armature (159) of linear motor (161). Thus, a velocity loop is closed around this relatively light-weight and frictionfree mechanism.

The output of playback head (155) is connected to amplifier (175) whose output drives an average amplitude detector (177) which is essentially a full-wave rectifier and filter. The derived amplitude information is made available to two sample-and-hold circuits (179, 181). The trigger pulses for these circuits are derived as follows.

A dither oscillator (183) feeds the above-described velocity loop through summing node (171) so that head (155) vibrates back and forth perpendicularly to the recorded spiral on disk (151). The amplitude of the dither signal is adjusted so that the head (155) moves about one-quarter of the width of the recorded track. The motion of head (155) is followed by the differential photodetector (165), and the resultant signal appears at the output of the differentiator (169). Crossover detector (185) gives output pulses (187) for positive zero crossings (corresponding to maximum negative travel of the carriage arm) and pulses (189) for negative zero crossings (corresponding to maximum positive travel of the carriage). These pulse trains (187, 189) trigger the sample-and-hold circuits (179, 181) respectively. The result is that sample-and-hold (179) holds the amplitude of the playback signal found at maximum negative motion while sample-and-hold (181) holds the amplitude of the playback signal found at maximum positive motion. The sample-and-hold circuit will be more fully described subsequently with reference to FIG. 4.

The outputs from the sample-and-hold circuits (179, 181) are subtracted from each other in summing node (191), the resultant steering signal (193) being proportional to the relative position of the center line of the recorded data track. This steering signal (193) is connected into the velocity loop at summing node (171) and constitutes a velocity request. If the steering signal (193) is zero, the playback head carriage arm (157) will continue to move back and forth only in response to dither oscillator (183). If the steering signal (193) is not zero, the playback head carriage arm (157) will be moved by the positioning mechanism, linear motor (161), in the appropriate direction until the steering signal is zero.

Figure 4:
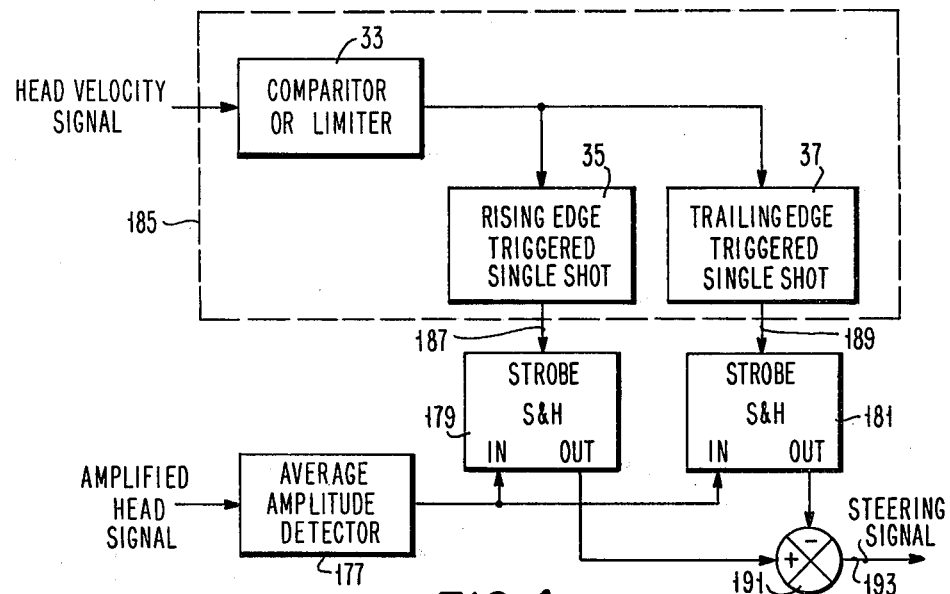
FIG. 4 is a more detailed diagram of the sample-and-hold circuits shown in FIG. 1; and, FIG. 5 is a more detailed diagram of the sychronous rectifier shown in FIG. 2.

Referring to FIG. 4, the sample-and-hold circuits of FIG. 1 will now be described. The comparator (33) squares up the head velocity signal so that its output switches when the head (155) is at the peaks of its swing. Single shot (35) is triggered as the velocity signal switches from minus to plus, while single shot (37) is triggered as the velocity signal switches from plus to minus. The resulting pulse streams (187, 189) strobe their respective sample-and-hold circuits (179, 181) as previously described with respect to FIG. 1. The circuit of FIG. 4 is somewhat expensive as it involves a dual single shot, two sample-and-holds, and a summing amplifier. FIG. 2 shows a synchronous rectifier approach, detailed in FIG. 5, which is clearly less expensive than the circuit of FIG. 4 because it requires fewer amplifiers and no single shots.

Referring now to the FIG. 2, a second embodiment of the playback station will be described. The magnetic disk (151) on which information has been recorded is spun by motor (153) next to playback head (155). The head (155) is positioned by playback head carriage arm (157), which is connected to the armature (159) of linear motor (161), energizable by means of a coil wrapped around the armature (159).

The position of the carriage arm is detected by a position detector. Recall that in the position detector disclosed in FIG. 1, a lamp (163) is mounted on the head carriage arm (157) in such a way as to illuminate a differential photodetector (165). The output of the photodetector has substantially a direct relationship to the position of the head carriage arm. However, the relationship is nonlinear so that there are significant gain variations over the distance traveled by the carriage arm. This gain variation, besides complicating the gain stabilization of the entire servo loop, prohibits locating the carriage arm with sufficient accuracy.

FIGS. 2 and 3 of the present specification show an improved way to detect the carriage arm position. A shadown plate (13) is mounted on the head carriage arm (157), extending out to one side thereof. This plate slides between a set of lamps (15) and a long photocell (11) so that the total amount of light on the photocell, and thus the electrical current out of it, is proportional to the position of the carriage arm. The results are much more linear than with the alternate technique disclosed in FIG. 1.

The lamp (15) has to be a line source rather than a point source. A line filament lamp may be used. In practice such a lamp may have a vibrating filament which may set up system resonances that may disturb the carriage arm servo loop. An experimental model has worked well using a series of point source lamps (15) wired in parallel in place of the line filament lamp. The fact that individual lamps will have different outputs has not been a problem; however, those skilled in the art can utilize compensating circuitry if necessary.

The light output of a lamp is a function of the voltage applied and the operating temperature. An additional photocell (21) is used to monitor the lamp output and control the voltage to the lamp. This circuit is shown in detail in FIG. 2. The bias resistor (29) to −Vs sets the desired lamp monitor photocell (21) output. Any variation in this output is detected by the op-amp (27) which varies the drive to the series of point source lamps (15). The feedback loop serves to keep the light output of lamps (15) constant regardless of temperature and power line variations. A similar feedback loop may be used with the circuit shown in FIG. 1.

The output of photocell (11) is pulled through resistor (149) by amplifier (167) so that the amplifier's output voltage is proportional to the position of the carriage arm (157). The amplifier (167) drives differentiator (169), which drives power amplifier (173) through summing node (171). The overall result of the abovedescribed signal processing is a velocity feedback loop around the playback head carriage arm (157) as required.

FIG. 2 also shows an alternative way to dither the head shown in FIG. 1. A vibrator (39) is placed between the head carriage arm (157) and the read/write head (155). This technique for dithering has the following advantage over the technique shown in FIG. 1. Because the vibrator (39) is moving only the actual read/write head, it handles much less power for the same amount of dithering as compared with the carriage arm-drive motor (161) dithering of FIG. 1. Such a vibrator is well known in the art and may be for example, but not limited to, a piezoelectric crystal or a audio speaker style linear motor.

The vibrator (39) causes the head (155) to move back and forth on the head carriage arm an amount that is small with respect to the width of the data track. This vibration causes an amplitude modulation of the signal being recovered from the data track by the playback head (155). This amplitude modulation contains information about the instantaneous position of the playback head with respect to the center line of the data track. This position information is recovered and used to develop a steering signal for controlling the position of the playback head carriage arm (157) as previously described with reference to FIG. 1.

Figure 5:
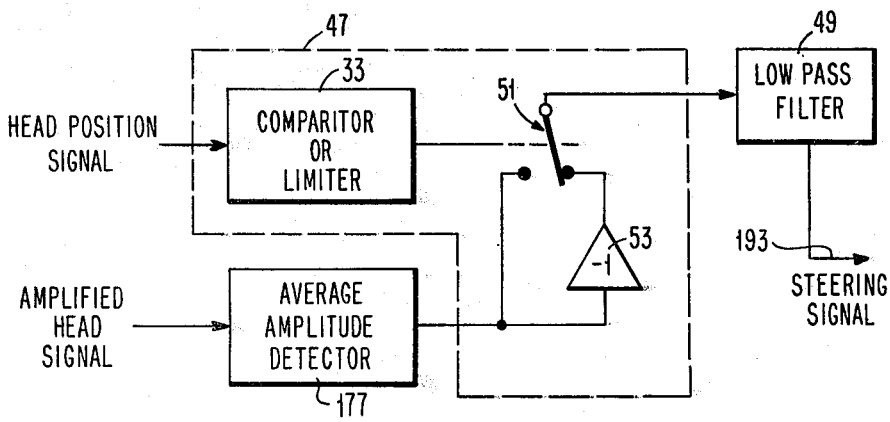

FIG. 2 and FIG. 5 show an alternative way to develop the steering signal shown in FIG. 1. The head output signal amplitude varies with respect to the head dither and the head location, right or left, with respect to the data track center line. The circuits must develop a steering signal of correct amplitude and polarity. Referring to FIG. 5, the head position signal is squared up by the comparator (33) so that its output switches as the head (155) moves to one side or the other of its average position. The output of comparator (33) operates a switch (51) which gates the output of the average amplitude detector (177), or its inverse (53), to the low-pass filter (49).

The two circuits of FIG. 4 and FIG. 5 do approximately the same thing to the output of the average amplitude detector (177). If this output is constant, the steering signal (193) will swing plus or minus along with the actual position of the read/write head as interpreted by the comparator (33). It should be pointed out that if the average head output is essentially constant, regardless of the head dithering, then the head is correctly positioned on the center line of the data track, and that any ripple on the steering signal must be filtered out. This filtering is best done, for both the circuits of FIG. 1 and FIG. 2, by placing a bandpass filter immediately following the average amplitude detector (177) as shown in FIG. 2.

When the head is on the data track center line, the output of this bandpass filter will in fact be a sine wave whose frequency is twice the dither frequency, with identical peaks at the extremes of the head excursion. The steering signal (193) from FIG. 4 will then be smooth and need no further filtering. The output of the synchronous rectifier (47) of FIG. 5, however, will be rich in the higher harmonics of the dither frequency, so a distinct low-pass filter (49) is required to develop the steering signal (193).

The overall result of the above-described signal processing of FIG. 1 or of FIG. 2, is a position feedback loop around the playback head carriage arm (157) which serves to keep the playback head (155) squarely on the center line of the data track. Since the linear motor (161) is a force transducer, this position feedback loop is a second-order system. It is stabilized by the previously-described velocity feedback loop.

The signal from playback head (155), amplified by amplifier (175), will have a triangular or sawtooth waveform. This signal is next processed by the pixel recovery electronics (194) described with respect to FIG. 4 of the above-referenced Miller, et al patent application.

SUMMARY

What has been described is an apparatus and method of reading information that has been recorded on a spiral data track on a recording medium. The apparatus moves the recording medium next to a playback head to thereby allow the playback head to read the information recorded on the data track. The playback head is moved across the recording medium, in a direction that is substantially orthogonal to the data track, by playback head-moving means, to follow the data track. The output from a position transducer attached to the playback head-moving means is differentiated to close a velocity loop through a summing junction and power amplifier. The playback head is vibrated independently or, alternatively, through motion of the playback head-moving means, by means of a dither oscillator operating at a relatively high frequency, and at low amplitude. This dithering causes an amplitude variation in the signal read from the playback head, the amplitude variation being proportional to the distance between the playback head and the track center line, and having a phase relationship to the dither oscillator indicative of the direction, left or right, from the center line of the data track. The amplitude information in the signal read from the playback head is converted into a steering signal, a velocity request signal, for use in the above-described velocity loop.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. Apparatus for following, with a reading head, a data track recorded on a recording medium comprising:

a recording medium on which information has been recorded on a data track;

a playback head;

recording medium-moving means for moving said recording medium with respect to said playback head to thereby allow said playback head to read the information recorded on said data track, said playback head having an output for carrying an electical signal representative of information recorded on said data track;

playback head-moving means for moving said playback head across said recording medium, in a direction that is substantially orthogonal to said data track;

velocity detector means for providing an electrical output which bears a direct relationship to the relative velocity of said playback head-moving means;

summing means connected to said velocity detector means, the output of said summing means being connected to said playback head-moving means to thereby drive said playback head-moving means to close a velocity loop around said playback head-moving means;

amplitude-detector means connected to said output of said playback head for providing, at an output of said amplitude detector means, a derived amplitude signal which is substantially the average amplitude of the signal output of said playback head;

dithering means for causing said playback head to vibrate at relatively high frequency in a direction that is substantially orthogonal to said data track, so that the amplitude of said signal output of said playback head varies according to the relative position of the head with respect to the center line of the data track being followed; and, demodulation means responsive to said dithering means for providing a steering signal which acts as a velocity request to said summing means so that the playback head is kept on the center line of the data track being followed;

whereby, if the steering signal is zero, said playback head is moved back and forth in response only to said dithering means, and if the steering signal is not zero, the playback head is moved in addition in response to said velocity request in the appropriate direction until said steering signal is zero.

2. The combination in accordance with claim 1 wherein said velocity-detector means comprises;

a shadow plate mounted on said head-carriage arm extending out to one side thereof;

a long photocell, and, a light source located with respect to said shadow plate such that said plate slides between said light source and said long photocell so that the total amount of light on said photocell, and thus the electrical current out of it, is proportional to the position of said carriage arm;

a current-to-voltage converter operating on the current from said photocell to develop a voltage proportional to the position of said carriage arm; and, a differentiator acting on the output of said current-to-voltage converter to develop a voltage proporational to the velocity of said carriage arm.

3. The combination in accordance with claims 1 or 2 wherein said demodulation means includes:

a synchronous rectifier connected to said dithering means and to said amplitude detector means; and, a ripple-reduction filter connected to the output of said synchronous rectifier.

4. The combination in accordance with claims 1 or 2 wherein said demodulation means includes:

a first sample-and-hold circuit;

a second sample-and-hold circuit;

said first and second sample-and-hold circuits being connected to the output of said amplitude-detector means and to said dithering means, such that said first and second sample-and-hold circuits are triggered alternately by said dithering means, so that said first sample-and-hold circuit holds the amplitude-detector output at the positive dither extreme and said second sample-and-hold circuit holds the amplitude-detector output at the negative dither extreme; and, means connected to the outputs of said first and second sample-and-hold circuits for subtracting the output of said first sample-and-hold circuit from the output of said second sample-and-hold circuit so as to produce said steering signal.

5. The combination in accordance with claims 1 or 2 wherein said dithering means includes means connected to said playback head moving means for imparting a relatively high frequency, low amplitude motion to said playback head-moving means in a direction that is substantially orthogonal to said data track, to thereby cause the playback head and the playback head-moving means to vibrate together.

6. The combination in accordance with claims 1 or 2 wherein said dithering means includes means connected to said playback head for imparting a relatively high frequency, low amplitude motion to said playback head in a direction that is substantially orthogonal to said data track, to thereby cause the playback head to vibrate relative to said playback head-moving means.

7. The combination in accordance with claim 3 wherein said dithering means includes means connected to said playback head-moving means for imparting a relatively high frequency, low amplitude motion to said playback head-moving means in a direction that is substantially orthogonal to said data track, to thereby cause the playback head and the playback head-moving means to vibrate together.

8. The combination in accordance with claim 4 wherein said dithering means includes means connected to said playback head-moving means for imparting a relative high frequency, low amplitude motion to said playback head-moving means in a direction that is substantially orthogonal to said data track, to thereby cause the playback head and the playback head-moving means to vibrate together.

9. The combination in accordance with claim 3 wherein said dithering means includes means connected to said playback head for imparting a relatively high frequency, low amplitude motion to said playback head in a direction that is substantially orthogonal to said data track, to thereby cause the playback head to vibrate relative to said playback head-moving means.

10. The combination in accordance with claim 4 wherein said dithering means includes means connected to said playback head for imparting a relatively high frequency, low amplitude motion to said playback head in a direction that is substantially orthogonal to said data track, to thereby cause the playback head to vibrate relative to said playback head-moving means.

11. A method for following, with a reading head, the center line of a data track recorded on a recording medium comprising the steps of:

moving said recording medium with respect to a playback head, to thereby allow said playback head to read information recorded on said data track, said playback head having an output for carrying a first electrical signal representative of said information recorded on said data track;

moving said playback head across said recording medium in a direction that is substantially orthogonal to said data track;

providing a second electrical signal which bears a direct relationship to the relative velocity of said playback head-moving means;

causing said playback head to vibrate substantially orthogonal to said data track at a relatively high frequency and low amplitude about the center line of said data track;

developing a third electrical signal which is substantially the average amplitude of said first signal output of said playback head, said third electrical signal having an amplitude modulation proportional to changes in the amplitude of said first signal caused by the vibration of said playback head about said center line;

demodulating said amplitude modulated signal to provide a demodulated signal; and, moving said playback head in response to said second electrical signal and said demodulated signal, such that said demodulated signal acts as a velocity request to cause said reading head to be moved an appropriate distance and in such a direction so as to maintain said playback head on the center line of said data track.

12. The method in accordance with claim 11 wherein the step of demodulating said amplitude-modulated signal to provide a demodulated signal further comprises the steps of:

rectifying said amplitude modulated signal in synchronism with the vibration of said playback head to thereby generate a fourth output signal that is proportional to said amplitude-modulated signal when said playback head is on one side of its average position with respect to said vibration, and a fifth output signal that is proportional to the inverse of said amplitude-modulated signal when said playback head is on the other side of its average position with respect to said vibration, and, combining and filtering said fourth and fifth signals through a ripple-reduction filter to thereby produce said demodulated signal.

13. The method in accordance with claim 11 wherein the step of demodulating said amplitude-modulated signal to provide a demodulated signal further comprises the steps of:

holding the amplitude of said average output signal occurring at one extreme of said vibration in a first sample-and-hold circuit;

holding the amplitude of said average output signal occurring at the opposite extreme of said vibration in a second sample-and-hold circuit; and, subtracting the outputs of said sample-and-hold circuits one from the other to thereby produce said demodulated signal.

14. The method in accordance with claims 11, 12, or 13 wherein the step of causing said reading head to vibrate substantially orthogonal to said data track at a relatively high frequency and low amplitude about the center line of said data track further comprises the steps of:

providing a carriage arm to which said playback head is connected so that moving said carriage arm appropriately will cause said playback head to follow said data track; and, imparting a relatively high frequency, low amplitude motion to said carriage arm in a direction that is substantially orthogonal to said data track, to thereby cause the playback head and said carriage arm to vibrate together; and, wherein the step of moving said playback head in response to said second electrical signal and said demodulated signal, such that said demodulated signal acts as a velocity request to cause said reading head to be moved in such a direction so as to maintain said playback head on the center line of said data track, further comprises the step of:

moving said carriage arm in response to said second electrical signal and said demodulated signal.

15. The method in accordance with claims 11, 12, or 13 wherein the step of causing said reading head to vibrate substantially orthogonal to said data track at a relatively high frequency and low amplitude about the center line of said data track further comprises the steps of:

providing a carriage arm to which said playback head is connected so that moving said carriage arm appropriately will cause said playback head to follow said data track; and, imparting a relatively high frequency, low amplitude motion to said playback head in a direction that is substantially orthogonal to said data track, to thereby cause the playback head to vibrate relative to said carriage arm; and, wherein the step of moving said playback head in response to said second electrical signal and said demodulated signal, such that said demodulated signal acts as a velocity request to cause said reading head to be moved in such a direction so as to maintain said playback head on the center line of said data track, further comprises the step of:

moving said carriage arm in response to said second electrical signal and said demodulated signal.

* * * * *